(12) United States Patent
Tanaka et al.

(10) Patent No.: US 6,219,072 B1
(45) Date of Patent: Apr. 17, 2001

(54) MICROCOMPUTER WITH A BUILT IN CHARACTER DISPLAY CIRCUIT AND VISUAL DISPLAY UNIT USING SUCH A MICROCOMPUTER

(75) Inventors: Keisuke Tanaka, Osaka; Takahiro Ochi, Kyoto, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/160,860

(22) Filed: Sep. 25, 1998

(30) Foreign Application Priority Data

Sep. 29, 1997 (JP) .................................................. 9-263118

(51) Int. Cl.[7] .................................................. G06F 15/167
(52) U.S. Cl. .......................... 345/512; 345/192; 348/569; 348/563
(58) Field of Search ..................................... 345/192, 194, 345/195, 512, 520, 521, 141, 471, 467–469, 519; 348/563–564, 569, 570

(56) References Cited

U.S. PATENT DOCUMENTS

| 4,742,344 | * | 5/1988 | Nakagawa et al. | ..................... 345/26 |
| 5,623,316 | * | 4/1997 | Naito et al. | ........................... 348/569 |
| 5,640,502 | | 6/1997 | Knox et al. | ........................... 345/507 |
| 5,642,138 | * | 6/1997 | Hijikata | ................................ 345/200 |
| 5,712,663 | * | 1/1998 | Matsumoto | ........................... 345/195 |
| 6,034,673 | * | 3/2000 | Kim | ..................................... 345/195 |
| 6,072,462 | * | 6/2000 | Movshovich | .......................... 345/141 |

FOREIGN PATENT DOCUMENTS

| 01304488 | 8/1989 | (JP) | ................................. G09G/1/00 |
| 03043792 | 2/1991 | (JP) | ................................. G09G/5/22 |
| 07191953 | 7/1995 | (JP) | ............................... G06F/15/78 |
| 08123400 | 5/1996 | (JP) | ................................. G09G/5/32 |

* cited by examiner

Primary Examiner—Kee M. Tung
(74) Attorney, Agent, or Firm—McDermott, Will & Emery (57) ABSTRACT

Disposed in a single integrated circuit chip are a central processing unit (CPU) for performing instruction execution, an on-screen display (OSD) circuit for displaying character information on a display screen, a read only memory (ROM) which is arbitrarily divided into a first ROM storage space for use by the CPU and a second ROM storage space for use by the OSD circuit, a random access memory (RAM) which is arbitrarily divided into a first RAM storage space for use by the CPU and a second RAM storage space for use by the OSD circuit, and a common bus which is composed of a data bus and an address bus. The CPU, the OSD circuit, the ROM, and the RAM are connected to the common bus in such a way as to allow the CPU and the OSD circuit to acquire an exclusive right to use the ROM and the RAM. When the common bus is not in use by the CPU, a message that said common bus is made available to the OSD circuit is communicated from the CPU to the OSD circuit via a bus liberation signal line, and the OSD circuit obtains a right to use the common bus.

24 Claims, 5 Drawing Sheets

MICROCOMPUTER WITH A BUILT IN CHARACTER DISPLAY CIRCUIT AND VISUAL DISPLAY UNIT USING SUCH A MICROCOMPUTER

BACKGROUND OF THE INVENTION

This invention relates to a microcomputer with a built in character display circuit (hereinafter called the OSD (onscreen display) circuit) for displaying character information on a display screen, and to a visual display unit that employs such a microcomputer.

In order to achieve improvements in device operability and to display various information, AV (audio/video) devices, such as television receivers and video cassette recorders, contain a microcomputer with an OSD capability to display character information on a display screen (e.g., a CRT display and an LCD (liquid crystal display)).

A typical conventional microcomputer with a built in OSD circuit is described. Generally, such a conventional microcomputer comprises a CPU (central processing unit) for executing instructions, a ROM (read only memory) for storing CPU instructions, a RAM (random access memory) which stores CPU data or serves as a stack region, an OSD circuit for displaying character information on a display screen, a ROM for storing font data of characters, and a RAM for storing character information including (i) character codes representing the characters and (ii) attribute data of the characters such as character size data and character color data. In such a conventional microcomputer architecture, the CPU requires its own ROM and RAM while the OSD circuit also requires its own ROM and RAM. This results in an increase in chip area. Another problem is that since ROMs and RAMs necessary for CPUs are different in storage capacity from ROMs and RAMs necessary for OSD circuits with respect to the grade of AV devices, to the destination thereof, and to required OSD capabilities, numerous types of products are required to be prepared when trying to achieve an optimal design according to various specifications.

SUMMARY OF THE INVENTION

The present invention was made to provide solutions to the above-described problems. Accordingly, an object of the present invention is to provide a microcomputer with a built in OSD circuit capable of achieving a reduction in chip area and of being designed readily and optimally with respect to various specifications. Another object of the present invention is to provide a visual display unit that employs a microcomputer of the present invention.

The present invention discloses a first microcomputer architecture. The first microcomputer architecture of the present invention comprises (a) a central processing unit (CPU) for instruction execution, (b) an on-screen display (OSD) circuit for display of character information on a display screen, (c) a read only memory (ROM) which is arbitrarily divided into a first ROM storage space for use by the CPU and a second ROM storage space for use by the OSD circuit, (d) a random access memory (RAM) which is arbitrarily divided into a first RAM storage space for use by the CPU and a second RAM storage space for use by the OSD circuit, (e) a common bus which is made up of a data bus and an address bus and to which the CPU, the OSD circuit, the ROM, and the RAM are connected in such a way as to allow the CPU and the OSD circuit to acquire an exclusive right to use the ROM and the RAM, and (f) a bus liberation signal line over which when the common bus is not in use by the CPU, a message that the common bus is made available to the OSD circuit is sent to the OSD circuit from the CPU.

Aspects of the first microcomputer architecture of the present invention are discussed. In accordance with the first microcomputer architecture of the present invention, the ROM is divided into two storage spaces, namely the first ROM storage space (which is used by the CPU) and the second ROM storage space (which is used by the OSD circuit), and the RAM is likewise divided into two storage spaces, namely the first RAM storage space (which is used by the CPU) and the second RAM storage space (which is used by the OSD circuit). Such ROM and RAM storage space division makes it possible to meet various specifications. The CPU and the OSD circuit can access the ROM and the RAM in a time-sharing manner. When the OSD circuit is notified of the fact from the CPU that the common bus is available to the OSD circuit, the OSD circuit is made able to immediately access the ROM or the RAM.

The present invention discloses a second microcomputer architecture. The second microcomputer architecture of the present invention comprises (a) a central processing unit (CPU) for instruction execution, (b) an on-screen display (OSD) circuit for display of character information on a display screen, (c) a read only memory (ROM) which is arbitrarily divided into a first ROM storage space for use by the CPU and a second ROM storage space for use by the OSD circuit, (d) a random access memory (RAM) which is arbitrarily divided into a first RAM storage space for use by the CPU and a second RAM storage space for use by the OSD circuit, (e) a first common bus which is made up of a data bus and an address bus and to which the CPU, the OSD circuit, and the ROM are connected in such a way as to allow the CPU and the OSD circuit to acquire an exclusive right to use the ROM, (f) a second common bus which is made up of a data bus and an address bus and to which the CPU, the OSD circuit, and the RAM are connected in such a way as to allow the CPU and the OSD circuit to acquire an exclusive right to use the RAM, and (g) a bus liberation signal line over which when any one of the first and second common buses is not in use by the CPU or when neither of the first common bus and the second common bus is in use by the CPU, a message that the unused common bus or buses are made available to the OSD circuit is sent to the OSD circuit from the CPU.

Aspects of the second microcomputer architecture of the present invention are discussed. In accordance with the second microcomputer architecture of the present invention, at the same time that the CPU accesses one of the ROM and the RAM, the OSD circuit can access the other, whereby the OSD circuit can frequently access the ROM or the RAM without requesting the CPU to temporarily stop using a bus (the first or second common bus, whichever is needed by the OSD circuit). Additionally, when the OSD circuit is notified of the fact that one of the first and second common buses, that is not in use by the CPU, is available to the OSD circuit, the OSD circuit is made able to immediately start accessing the ROM or the RAM. Provision of bus switches for connecting together the first and second common buses provides conveniences when the CPU reads out data from the ROM and when the CPU reads out an instruction from the RAM.

The present invention provides a third microcomputer architecture. The third microcomputer architecture of the present invention comprises (a) a central processing unit (CPU) for instruction execution in units of n-bit widths where the number n is any integer, (b) an on-screen display (OSD) circuit for display of character information on a display screen, (c) a read only memory (ROM) for storing instructions for the CPU and character font data for the OSD circuit in storage spaces of the ROM which are used by the CPU and the OSD circuit respectively, (d) a ROM access controller for control of access to the ROM by the CPU or by the OSD circuit, (e) a data bus having a width of n bits for establishment of connection between the CPU and the ROM access controller, and (f) a ROM output data signal line having a width of 2n bits for establishment of connection between the ROM and the ROM access controller.

Aspects of the third microcomputer architecture of the present invention are discussed. In accordance with the third microcomputer architecture of the present invention, it is possible to read out ROM data of 2n bits from the ROM by an instruction of n bits from the CPU. In other words, if the ROM is accessed, via the ROM access controller, on the basis of an even address value output to the ROM from the CPU, then it is possible to read out 2n-bit ROM data, comprised of first ROM data of n bits corresponding to the even address value and second ROM data of n bits corresponding to an odd address value next to and continuous with the even address value, from the ROM to the ROM access controller. Of the 2n bit ROM data, the first n-bit ROM data corresponding to the even address value is transferred to the CPU, while the second n-bit ROM data corresponding to the odd address value is temporarily held in the ROM access controller. As a result of such arrangement, when the odd address value continuous with the even address value is output from the CPU to the ROM access controller, the ROM access controller is able to transfer to the CPU the second n-bit ROM data held in the ROM access controller and corresponding to the odd address value without access to the ROM, during which period the OSD circuit accesses the ROM via the ROM access controller to read out the character font data from the ROM to the OSD circuit.

DETAILED DESCRIPTION OF THE INVENTION

Embodiments of the present invention are now described below with reference to the accompanying drawing figures.

Figure 1:
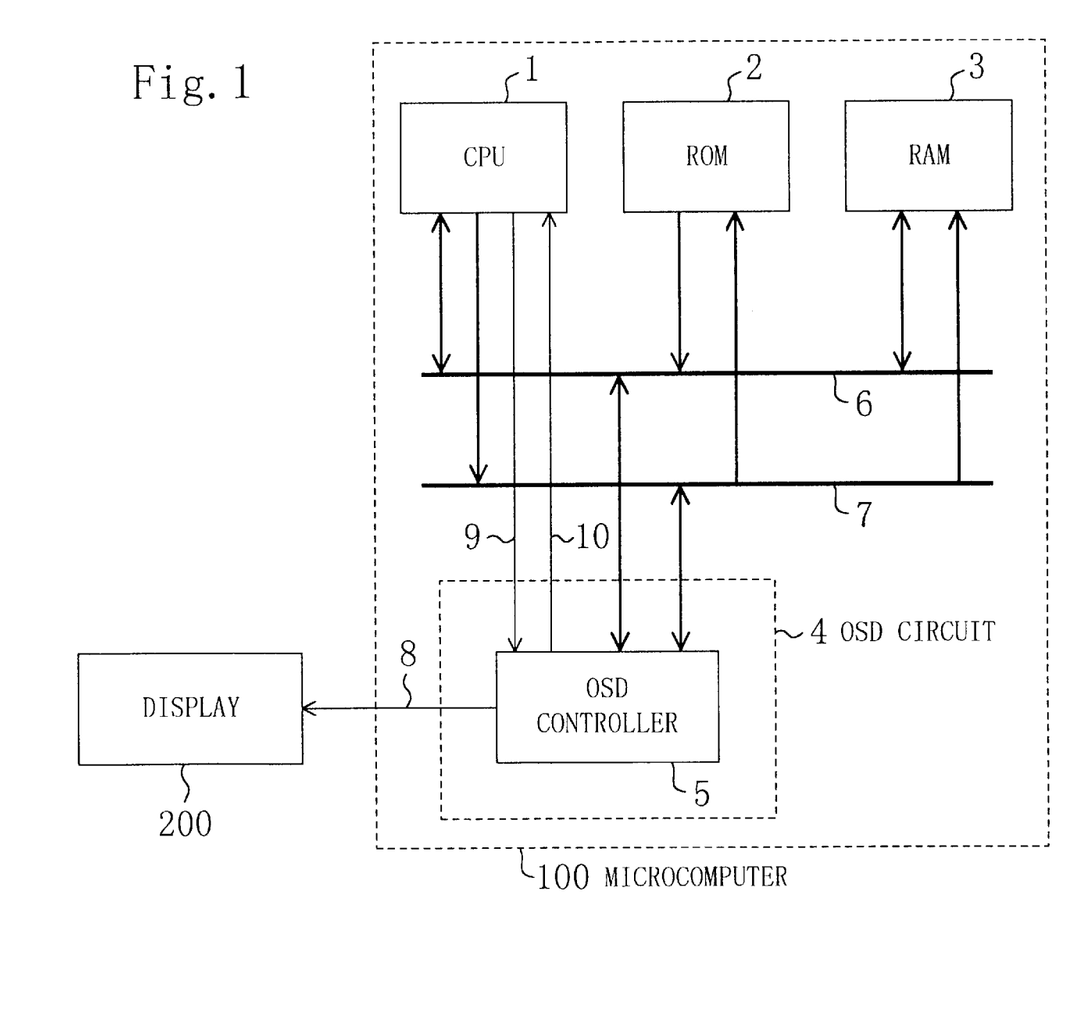
FIG. 1 illustrates in block diagram form a visual display unit comprising a microcomputer with a built in OSD circuit in accordance with the present invention and a display device.

FIG. 1 illustrates a visual display unit which is made up of a microcomputer 100 with a built in OSD (on-screen display) circuit of the present invention and a display device 200. The microcomputer 100 comprises a CPU (central processing unit) 1, a ROM (read only memory) 2, a RAM (random access memory) 3, and an OSD circuit 4. Each of these components 1–4 is connected to a data bus 6 and to an address bus 7. The OSD circuit 4 has a controller 5. The controller 5 generates a display signal. The generated display signal is sent to the display device 200 via a display signal line 8. The microcomputer 100 further comprises a bus liberation signal line 9 and a bus request signal line 10. When any one of the ROM 2 and the RAM 3 is not in use by the CPU 1, the bus liberation signal line 9 serves as a communication line to convey a message that the buses 6 and 7 are available to the OSD circuit 4. The bus request signal line 10 is a communication line over which a request that the buses 6 and 7 be made available to the OSD circuit 4 is sent to the CPU 1 from the OSD circuit 4.

In accordance with the FIG. 1 structure, the ROM 2 and the RAM 3 are arbitrarily divided and set by an instruction program of the CPU 1 so as to provide individual storage spaces (storage capacities) for use by the CPU 1 and by the OSD circuit 4 respectively. Such divisional settings are stored in control registers (not shown in FIG. 1) of the CPU 1 and the OSD circuit 4. For example, in the case the number of character types which are required to be displayed is large, it is set such that the OSD circuit 4 occupies more storage space in the ROM 2 than the CPU 1. As a result of such a setting, a large amount of character font data can be stored and the remaining ROM storage space can serve as a region in which to store instructions for the CPU 1. On the other hand, in the case the number of character types which are required to be displayed is small, it can be set such that the OSD circuit 4 occupies less storage space in the ROM 2 than the CPU 1. As a result of such a setting, instructions for the CPU 1 can be stored in a larger storage space. In the case the number of characters to be displayed at the same time on a single display screen is large, it can be set such that the OSD circuit 4 occupies more storage space in the RAM 3 than the CPU 1. As a result of such a setting, much character information can be stored, and the remaining RAM storage space becomes a region in which to store data for the CPU 1. On the other hand, in the case the number of characters to be displayed at the same time is small, it can be set such the OSD circuit 4 occupies less storage space for the storage of character information in RAM 3. As a result of such a setting, the CPU can occupy more storage space in the RAM 3 than the OSD circuit 4.

As described above, the ROM 2 and the RAM 3 are divided and set in advance. In other words, in ROM 2 a storage space for use by the CPU 1 (hereinafter called the first ROM storage space) and a storage space for use by the OSD circuit 4 (the second ROM storage space) are predefined, and in the RAM 3 a storage space for use by the CPU 1 (the first RAM storage space) and a storage space for use by the OSD circuit 4 (the second RAM storage space) are predefined. In the ROM 2, the first ROM storage space is used to store instructions for the CPU 1 while the second ROM storage space is used to store character font data for the OSD circuit 4. In the RAM 3, the first RAM storage space is used to store data or serves as a stack region as necessity requires while the second RAM storage space is used to store character information including character codes representing characters to be displayed and attribute data of the characters.

The CPU 1 sequentially reads out instructions from the ROM 2 via the data and address buses 6 and 7 and executes programmed instructions while using data of the RAM 3 as necessity requires. When displaying characters on the display screen, by virtue of the instruction execution of the CPU 1, the controller 5 of the OSD circuit 4 is controlled and the OSD circuit 4 is made to operate. Character display on the display screen by the OSD circuit 4 is done by the following series of operations.

(OPERATION 1) By virtue of the instruction execution of the CPU 1, codes representing characters to be displayed on a display screen and attribute data of the characters, such as character font size data and character font color data, are written to address locations of the RAM 3.

(OPERATION 2) If when executing an instruction, the CPU 1 does not access the RAM 3, both the data bus 6 and the address bus 7 are then made available to the OSD circuit 4, thereafter such bus availability being sent to the OSD circuit 4 from the CPU 1 via the bus liberation signal line 9.

(OPERATION 3) In such a bus liberation period (during which the RAM 3 is not accessed by the CPU 1), the controller 5 provides onto the address bus 7 the address value of an address location of the RAM 3 at which a corresponding character code and attribute data to a display location are stored.

(OPERATION 4) Based on the address value of the RAM 3 provided onto the address bus 7, data, comprised of the character code and attribute data, is read out to the controller 5 of the OSD circuit 4 from the RAM 3 via the data bus 6.

(OPERATION 5) If when executing an instruction, the CPU 1 does not access the ROM 2, both the data bus 6 and the address bus 7 are then made available to the OSD circuit 4, thereafter such bus availability being sent to the OSD circuit 4 from the CPU 1 via the bus liberation signal line 9.

(OPERATION 6) In such a bus liberation period (during which the ROM 2 is not accessed by the CPU 1), the controller 5 provides, onto the address bus 7, the address value of an address location of the ROM 2 at which character font data, obtained by calculation on the basis of the character code from the RAM 3, is stored.

(OPERATION 7) Based on the address value of the ROM 2 provided onto the address bus 7, the character font data is read out from the ROM 2 for forwarding to the controller 5 via the data bus 6.

(OPERATION 8) In the controller 5, a display signal is generated based on the attribute data from the RAM 3 and on the character font data from the ROM 2. The generated display signal is delivered to the display device 200 via the display signal line 8.

It is required that necessary display signals be sent to the display device 200 within a certain length of time determined according to its scanning. If the OSD circuit 4 fails to read out attribute data and character font data within such a limited time from the RAM 3 and from the ROM 2 respectively, then no correct display signals are generated. This results in abnormalities in display quality, such as display inaccuracy in size and color. In order to prevent such an error display operation from taking place, the OSD circuit 4 requests, via the bus request signal line 10, the CPU 1 to make the buses available if the CPU 1 does not make the buses available to the OSD circuit 4 within a length of time taken for the OSD circuit 4 to display characters. In response to such a bus request from the OSD circuit 4, the CPU 1 temporarily stops instruction execution, makes the buses available to the OSD circuit 4, sends out a bus liberation signal to the OSD circuit 4 via the bus liberation signal line 9, and transfers a right to use the buses to the OSD circuit 4. When the bus liberation signal from the CPU 1 is confirmed in the OSD circuit 4, the OSD circuit 4 accesses either the ROM 2 or the RAM 3 as necessity requires. The foregoing display abnormalities can be avoided.

Figure 2:
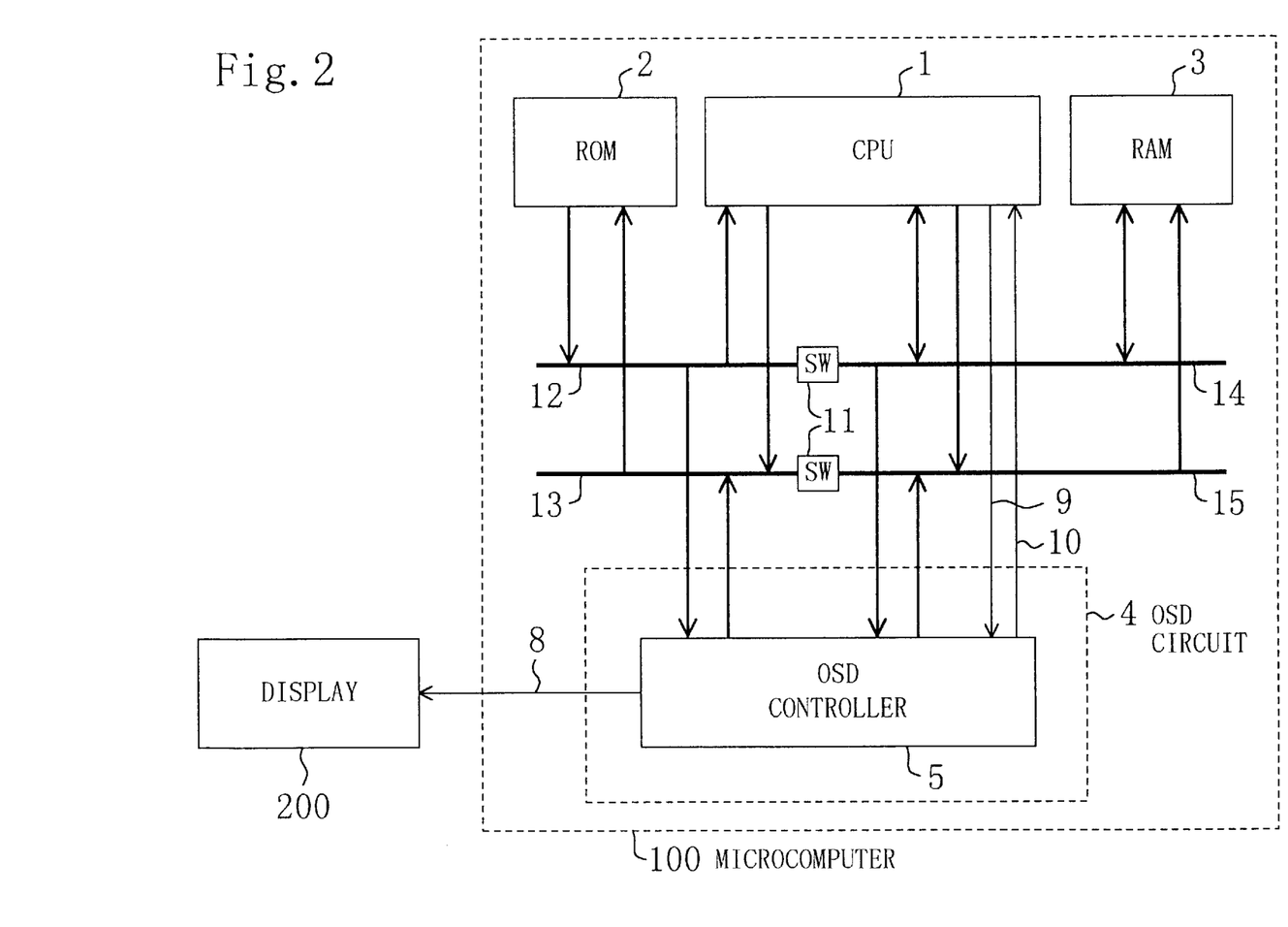
FIG. 2 illustrates in block diagram form a visual display unit comprising another microcomputer with a built in OSD circuit in accordance with the present invention and a display device.

FIG. 2 illustrates a visual display unit comprising another microcomputer 100 with a built in OSD circuit of the present invention and the display device 200. In addition to the CPU 1, the ROM 2, the RAM 3, and the OSD circuit 4, the microcomputer 100 has a data bus 12, an address bus 13, a data bus 14, and an address bus 15. The ROM 2 is connected to the CPU 1 and to the OSD circuit 4 by the data and address buses 12 and 13. The RAM 3 is connected to the CPU 1 and to the OSD circuit 4 by the data and address buses 14 and 15. The microcomputer 100 further has two bus switches 11 and 11. One of the bus switches 11 is connected between the data buses 12 and 14 and the other bus switch 11 is connected between the address buses 13 and 15. Except for the above, the visual display unit of FIG. 2 is identical in structure with the visual display unit of FIG. 1.

In the same way as previously described with reference to FIG. 1, the ROM 2 and the RAM 3 of FIG. 2 are divided and set in advance by an instruction program of the CPU 1 so as to provide individual storage spaces (a first and a second ROM storage space for use by the CPU 1 and by the OSD circuit 4 respectively, and a first and a second RAM storage space for use by the CPU 1 and by the OSD circuit 4 respectively). In the ROM 2, the first ROM storage space (which is assigned to the CPU 1) is used to store instructions for the CPU 1 while the second ROM storage space (which is assigned to the OSD circuit 4) is used to store character font data for the OSD circuit 4. In the RAM 3, the first RAM storage space (which is assigned to the CPU 1) is used to store data or serves as a stack region as necessity requires while the second RAM storage space (which is assigned to the OSD circuit 4) is used to store character information including character codes representing characters to be displayed and attribute data of the characters.

The CPU 1 sequentially reads out instructions from the ROM 2 via the data and address buses 12 and 13 and executes programmed instructions while using data of the RAM 3 via the data and address buses 14 and 15 as necessity requires. When displaying characters on the display screen, by virtue of the instruction execution of the CPU 1, the controller 5 of the OSD circuit 4 is controlled and the OSD circuit 4 is made to operate. Character display on the display screen by the OSD circuit 4 is done by the following series of operations.

(OPERATION 1) By virtue of the instruction execution of the CPU 1, codes representing characters to be displayed on a display screen and attribute data of the characters, such as character font size data and character font color data, are written to address locations of the RAM 3.

(OPERATION 2) If when executing an instruction, the CPU 1 does not access the RAM 3, both the data bus 14 and the address bus 15 are then made available to the OSD circuit 4, thereafter such bus availability being sent to the OSD circuit 4 from the CPU 1 via the bus liberation signal line 9.

(OPERATION 3) In such a bus liberation period (during which the RAM 3 is not accessed by the CPU 1), the controller 5 provides onto the address bus 15 the address value of an address location of the RAM 3 at which a corresponding character code and attribute data to a display location are stored.

(OPERATION 4) Based on the address value of the RAM 3 provided onto the address bus 15, data, comprised of the character code and attribute data, is read out to the controller 5 of the OSD circuit 4 from the RAM 3 via the data bus 14.

(OPERATION 5) If when executing an instruction, the CPU 1 does not access the ROM 2, both the data bus 12 and the address bus 13 are then made available to the OSD circuit 4, thereafter such bus availability being sent to the OSD circuit 4 from the CPU 1 via the bus liberation signal line 9.

(OPERATION 6) In such a bus liberation period (during which the ROM 2 is not accessed by the CPU 1), the controller 5 provides, onto the address bus 13, the address value of an address location of the ROM 2 at which character font data, obtained by calculation on the basis of the character code from the RAM 3, is stored.

(OPERATION 7) Based on the address value of the ROM 2 provided onto the address bus 13, the character font data is read out from the ROM 2 for forwarding to the controller 5 via the data bus 12.

(OPERATION 8) In the controller 5, a display signal is generated based on the attribute data from the RAM 3 and on the character font data from the ROM 2. The generated display signal is delivered to the display device 200 via the display signal line 8.

The structure of FIG. 2 is further described. If the CPU 1 does not make the data and address buses 12 and 13 (a first bus pair) or the data and address buses 14 and 15 (a second bus pair) available to the OSD circuit 4 within a length of time taken for the OSD circuit 4 to display characters, the OSD circuit 4 requests the CPU 1 to make the first bus pair or the second bus pair (whichever is requested by the OSD circuit 4) available to the OSD circuit 4, via the bus request signal line 10. In response to such a bus request from the OSD circuit 4, the CPU 1 stops using the requested bus pair, sends out a bus liberation signal to the OSD circuit 4 via the bus liberation signal line 9, and transfers a right to use the bus pair in question to the OSD circuit 4, which makes it possible to allow the OSD circuit 4 to access the ROM 2 or to the RAM 3 within the foregoing time. This prevents abnormal display operations from being carried out. In the foregoing description, when the OSD circuit 4 sends out a bus request to the CPU 1 only a requested bus pair is made available to the OSD circuit 4.

However, in response to a bus request, the CPU 1 may make both the first and second bus pairs available to the OSD circuit 4.

In the structure shown in FIG. 2, the ROM 2 and the RAM 3 are connected to independent different buses, thereby allowing the CPU 1 and the OSD circuit 4 to simultaneously use the ROM 2 or the RAM 3 via different buses.

For example, the following combinations are possible to make.

(COMBINATION 1) In which the CPU 1 uses both the ROM 2 and the RAM 3.

(COMBINATION 2) In which the CPU 1 uses the ROM 2 while the OSD circuit 4 uses the RAM 3.

(COMBINATION 3) In which the OSD circuit 4 uses the ROM 2 while the CPU 1 uses the RAM 3.

(COMBINATION 4) In which the OSD circuit 4 uses both the ROM 2 and the RAM 3.

Accordingly, when the OSD circuit 4 is used to display characters, it is possible to reduce the number of times the OSD circuit 4 makes a bus request to the CPU 1 to least sufficient frequency. Influence on the instruction execution instruction of the CPU 1 can be reduced.

Figure 3:
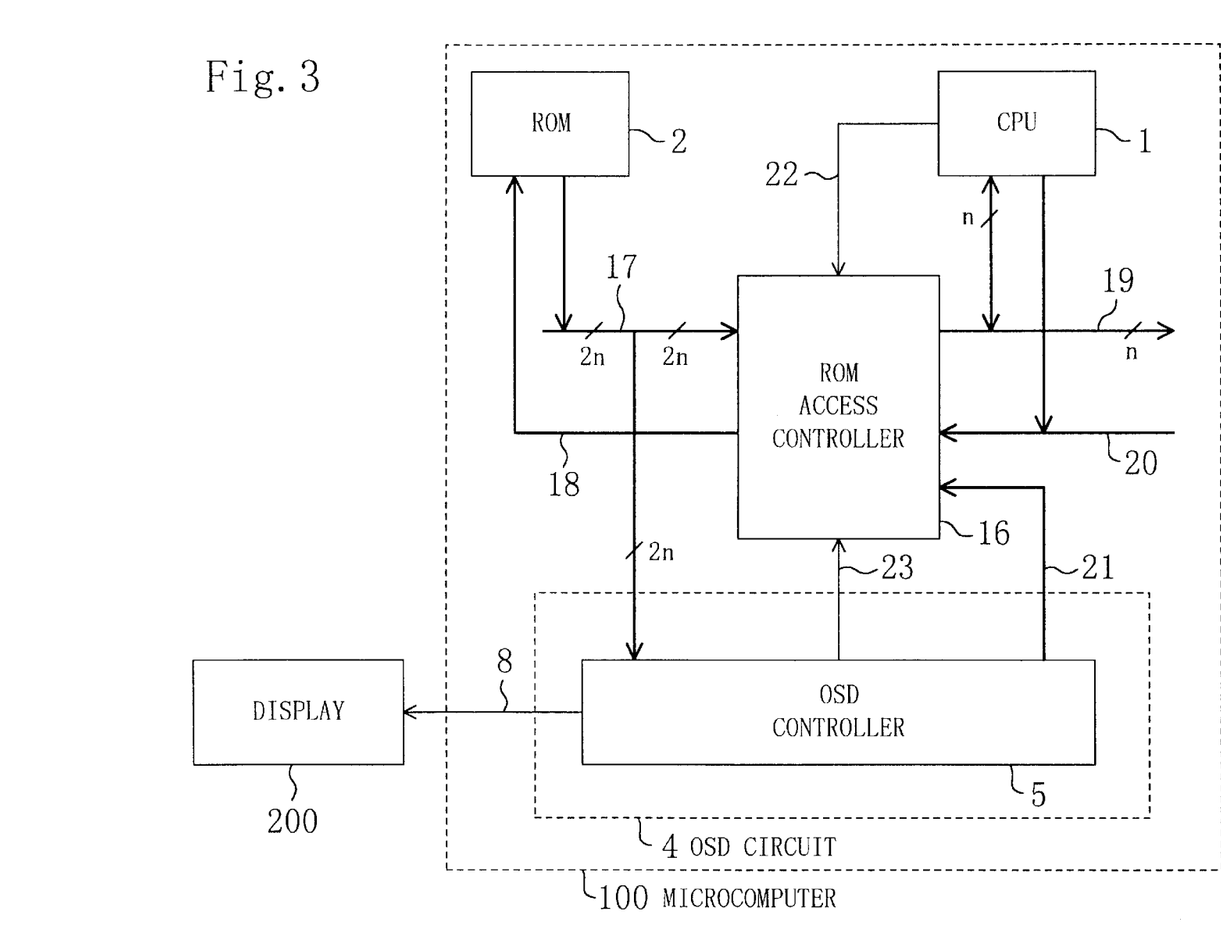
FIG. 3 illustrates in block diagram form a visual display unit comprising still another microcomputer with a built in OSD circuit in accordance with the present invention and a display device.

If the CPU 1 is constructed to have a port where only instructions can be input or output and a port where only data can be input or output, this enables the CPU 1 to take in data from the ROM 2 and to take in an instruction from the RAM 3 by closing the bus switch 11. In other words, the CPU 1 provides addresses to the ROM 2 from the data port through the address buses 13 and 15 and takes in data, read out from the ROM 2, into the data port through the data buses 12 and 14. The CPU 1 also provides addresses to the RAM 3 from the instruction port through the address buses 13 and 15 and takes in an instruction, read out from the RAM 3, into the instruction port through the data buses 12 and 14. FIG. 3 illustrates still another microcomputer 100 with a built in OSD circuit in accordance with the present invention. The microcomputer 100 of FIG. 3 has a ROM access controller 16 in addition to the CPU 1, the ROM 2, the OSD circuit 4, and the controller 5. FIG. 3 further shows, in addition to the display signal line 8, a ROM output data signal line 17 having a width of 2n bits where the number n is any integer, a ROM address signal line 18 extending from the ROM access controller 16 to the ROM 2, a data bus 19 having a width of n bits, an address bus 20 extending from the CPU 1 to the ROM access controller 16, an address signal line 21 extending from the OSD circuit 4 to the ROM access controller 16, a ROM address branch signal line 22, and a ROM access request signal line 23.

Figure 4:
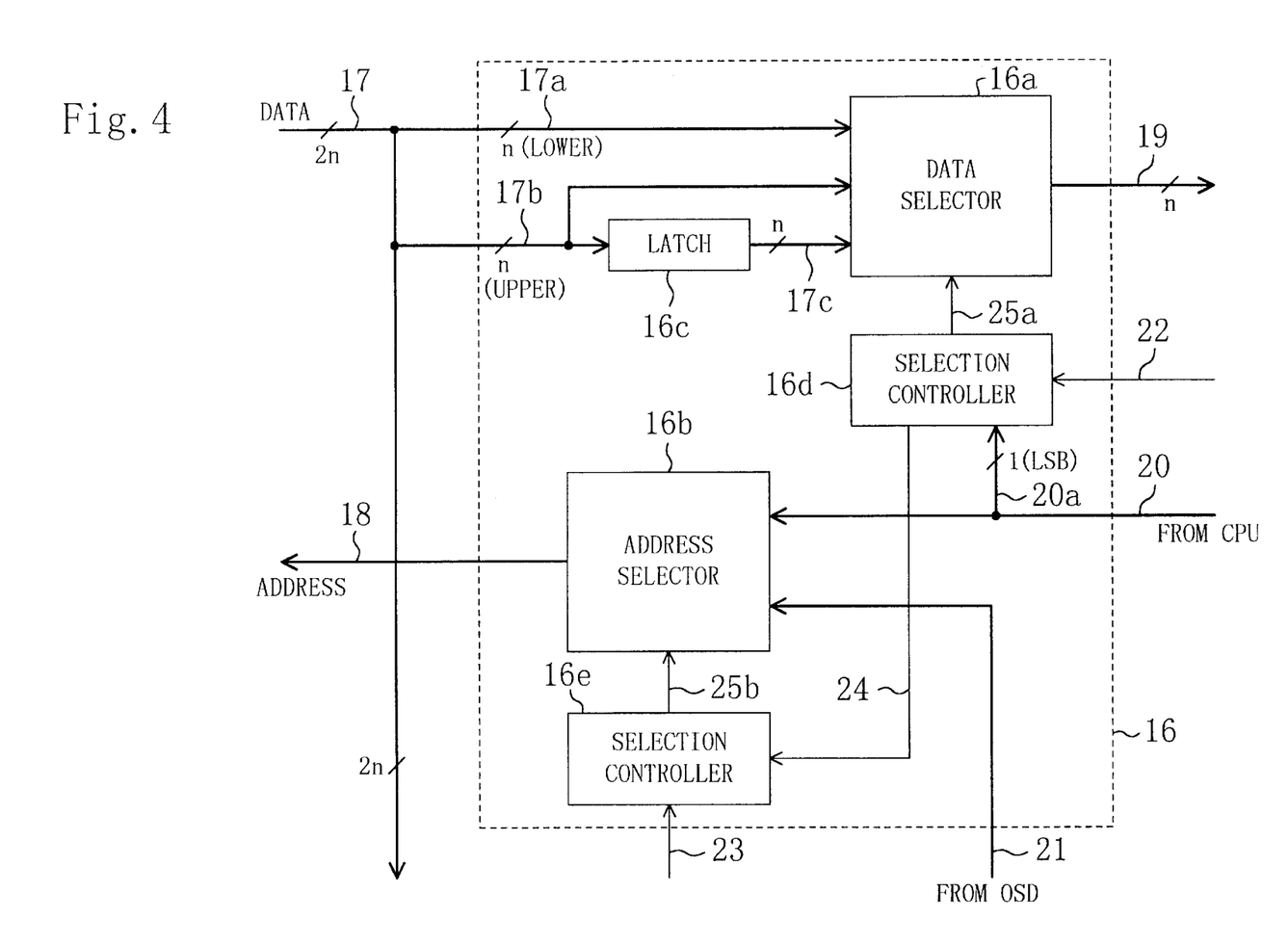
FIG. 4 illustrates in block diagram form an example of the internal structure of a ROM access controller of FIG. 3.

FIG. 4 illustrates an example of the internal structure of the ROM access controller 16. FIG. 4 shows a ROM data selector 16a, a ROM address selector 16b, a latch 16c, a selection controller 16d for the ROM data selector 16a, and a selection controller 16e for the ROM address selector 16b. Although an instruction of the CPU 1 is formed of n bits, the ROM 2 is accessed in units of 2n bits. Accordingly, whereas the data bus 19 has a width of n bits, the ROM output data signal line 17 has a width of 2n bits.

In accordance with the structures of FIGS. 3 and 4, the CPU 1 reads out an instruction identified by an even address from the ROM 2 together with an instruction identified by an odd address next to and continues with the even address. Such an odd address instruction is temporarily held in the ROM access controller 16, so that when the CPU 1 needs to read out the odd address instruction from the ROM 2, the instruction held in the ROM access controller 16 is fed to the CPU 1. In such a case, there is no need for the CPU 1 to access the ROM 2. However, if instruction branching or the like occurs resulting in breaking address continuity, the ROM 2 will be accessed although an odd address instruction is held in the ROM access controller 16.

Three manners of access from the CPU 1 to the ROM 2 (CONDITIONS 1 to 3) are described below:

(CONDITION 1) In which the CPU 1 accesses an even address (note: CONDITION 1 includes a case in which the CPU 1 accesses an even address continuous with an odd address that has been accessed by the CPU 1 just before the even address and a case in which the CPU 1 accesses an even address not continues with an even address or odd address that has been accessed by the CPU 1 just before the currently-accessed even address);

(CONDITION 2) In which the CPU 1 accesses an odd address continues with an even address that has been accessed by the CPU 1 just before the odd address; and (CONDITION 3) In which the CPU 1 accesses an odd address not continues with an even address or odd address that has been accessed by the CPU 1 just before the currently-accessed odd address.

In CONDITION 1, the ROM address selector 16b of FIG. 4 selects the address bus 20 and an address value output from the CPU 1 is input intact to the ROM 2 via the ROM address signal line 18. An instruction code of 2n bits read out from the ROM 2 is transferred to the ROM access controller 16 via the ROM output data signal line 17. In the ROM access controller 16, the ROM data selector 16a of FIG. 4 selects an n low-order bit line 17a of the ROM output data signal line 17 and the instruction code read out from the ROM 2 is transferred intact to the CPU 1. At the same time, n high-order bits of the instruction code read out from the ROM 2 are temporarily held in the latch 16c via an n high-order bit line 17b of the ROM output data signal line 17.

In CONDITION 2, the ROM data selector 16a selects an output signal line 17c connected to the latch 16c in which n high-order bits of ROM output data are temporarily held and an instruction code held in the latch 16c is transferred to the CPU 1. On the other hand, when a ROM access request signal is output from the OSD circuit 4 to the ROM access controller 16 via the ROM access request signal line 23, the ROM address selector 16b selects the address signal line 21 from the OSD circuit 4 and an address value for the reading of character font data is input to the ROM 2 via the ROM address signal line 18. Based on the address value thus input, character font data is read out from the ROM 2 in units of 2n bits and transferred to the controller 5 of the OSD circuit 4 via the ROM output data signal line 17. If no ROM access request signal is output from the OSD circuit 4, this means that there is no need for accessing the ROM 2, and the ROM address selector 16b can select any one of the address bus 20 and the address signal line 21.

CONDITION 3 is equivalent to a case in which ROM address continuity is broken due to, for example, an instruction branch and an interruption. In CONDITION 3, the ROM address selector 16b selects the address bus 20 and an address value output from the CPU 1 is input intact to the ROM 2 via the ROM address signal line 18. An instruction code of 2n bits read out from the ROM 2 is transferred to the ROM access controller 16 via the ROM output data signal line 17. In the ROM access controller 16, the ROM data selector 16a selects the n high-order bit line 17b of the ROM output data signal line 17 and the instruction code read out from the ROM 2 is transferred intact to the CPU 1.

In the foregoing three conditions, the ROM data selection controller 16d and the ROM address selection controller 16e serve as drive circuits for driving a selection signal line 25a of the ROM data selector 16b and a selection signal line 25b of the ROM address selector 16b respectively.

The ROM data selection controller 16d is controlled by the ROM address branch signal line 22 and by a least significant bit (LSB) line 20a of the address bus 20. This ROM address branch signal line 22 is asserted when ROM address continuity is broken because of, for example, an instruction branch and an interruption. In CONDITION 1 (in which the LSB line 20a of the address bus 20 indicates an even address (generally, logical zero), the n low-order bit line 17a of the ROM output data signal line 17 is selected independently of the ROM address branch signal line 22. In CONDITION 2 (in which the ROM address branch signal line 22 is not asserted and the LSB line 20a of the address bus 20 indicates an odd address (generally, logical one), the output signal line 17c coupled to the latch 16c is selected. In this way, when the ROM data selector 16a selects the output signal line 17c from the latch 16c, the ROM data selection controller 16d outputs onto an OSD access permission signal line 24 a signal conveying the information that the OSD circuit 4 is allowed to access the ROM 2. In CONDITION 3 (in which the ROM address branch signal line 22 is asserted and the LSB line 20a of the address bus 20 indicates an odd address (generally, logical one), the n high-order bit line 17b of the ROM output data signal line 17 is selected.

The ROM address selection controller 16e is controlled by the ROM access request signal line 23 from the OSD circuit 4 and by the OSD access permission signal line 24 from the ROM data selection controller 16d. Usually (in CONDITIONS 1 and 3), the ROM address selector 16b selects the address bus 20. In CONDITION 2 (in which both the OSD access permission signal line 24 and the ROM access request signal line 23 are asserted), the ROM address selector 16b selects the address signal line 21 from the OSD circuit 4.

The description of the present invention, made with reference to FIG. 4, has been made by taking an exemplary case in which data at even addresses are output to the n low-order bit line 17a of the ROM output signal line 17 while data at odd addresses are output to the n high-order bit line 17b of the ROM output signal line 17. An alternative can be made in which data at even addresses can be output to the n high-order bit line 17b while data at odd addresses can be output to the n low-order bit line 17a.

Figure 5:
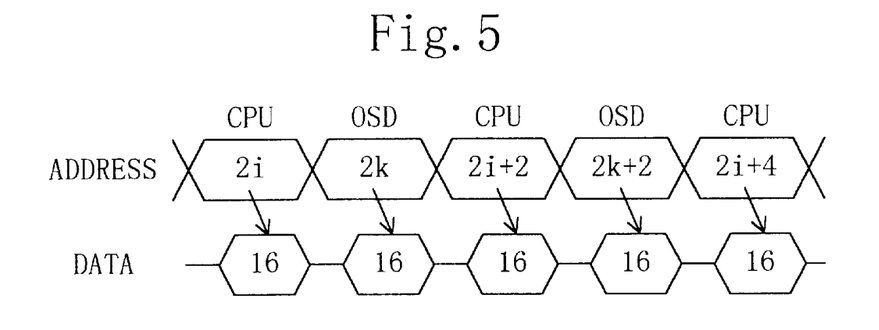
FIGS. 5–7 are timing diagrams showing examples of ROM access in the microcomputer of FIG. 3.
Figure 6:
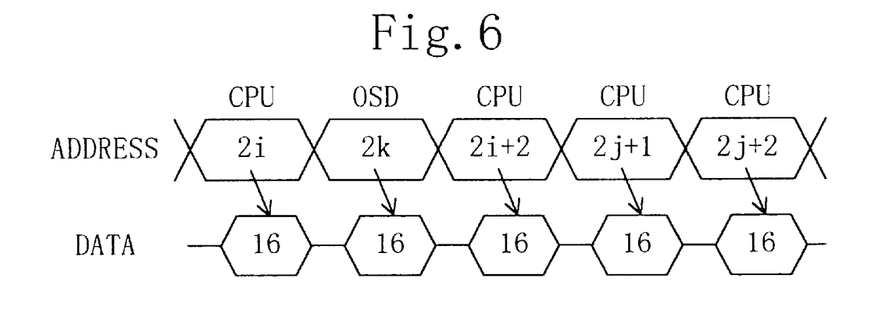
Figure 7:
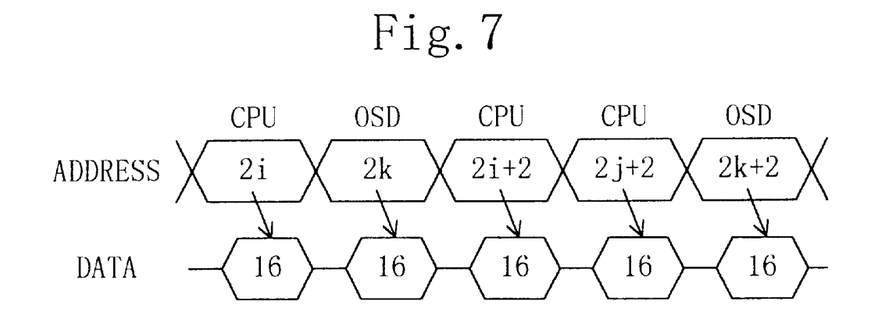

Referring to FIGS. 5–7, therein shown are examples of access to the ROM 2 in the microcomputer 100 of FIG. 3. Here, n (which is the instruction bit width) is eight and therefore the ROM 2 outputs data in units of 16 bits. Character font data is, for example, 12 dots per line and it is therefore more convenience for the ROM 2 to be accessed in units of 16 bits than in units of 8 bits.

FIG. 5 is an example in which address continuity is maintained. The continuity of address values used to fetch instructions is maintained, except for special cases.

Accordingly, if data are output from the ROM 2 in units of 8 bits, then there is no possibility of the OSD circuit 4 accessing the ROM 2. On the contrary, FIG. 5 shows that the CPU 1 accesses even addresses (address 2i, address 2i+2, and so on), at which time instructions at odd addresses (address 2i+1, address 2i+3, and so on) are also read out. This means that the OSD circuit 4 accesses the ROM 2 (at address 2k, address 2k+2, and so on) on the basis of the same and original access timing that the CPU 1 accesses odd addresses. Accordingly, the CPU 1 and the OSD circuit 4 alternately access the ROM 2, during which instructions are continuously fed to the CPU 1.

FIG. 6 is a timing diagram showing a first example in which address continuity is broken due to, for example, instruction branching. In the first example, there is made a change in address from the CPU 1, from address 2i+2 to an odd address, that is, address 2j+1. As long as the continuity of addresses from the CPU 1 with addresses 2i and 2i+2 is maintained, the same alternate access as shown in FIG. 5 can be carried out. However, when there occurs a branch from address 2i+2 to 2j+1, access to the ROM 2 by the CPU 1 has precedence, so that an instruction stored at address 2j+1 is transferred to the CPU 1. The next timing is an even address (address 2j+2) and 16 bits of instructions for the CPU 1 are read out from the ROM 2 at the same time. Thereafter, as long as address continuity is maintained, alternate access is again carried out.

FIG. 7 is a timing diagram showing a second example in which address continuity is broken due to, for example, instruction branching. In the second example, there is made a change in address from the CPU 1, from address 2i+2 to an even address, that is, address 2j+2. As long as the continuity of addresses from the CPU 1 with addresses 2i and 2i+2 is maintained, the same alternate access as shown in FIG. 5 can be carried out. However, when there occurs a branch from address 2i+2 to 2j+2, access to the ROM 2 by the CPU 1 has precedence, so that an instruction stored at address 2j+2 is transferred to the CPU 1. At this point in time, however, an instruction stored at the next odd address (address 2j+3) was already read out, so that access to the ROM 2 by the OSD circuit 4 becomes possible at the next timing.

As described above, the FIG. 3 structure makes it possible for the CPU 1 and the OSD circuit 4 to share a single ROM (the ROM 2) with exerting little influence on the operation of the CPU 1.

What is claimed is:

1. A microcomputer comprising:

a central processing unit (CPU) for instruction execution, an on-screen display (OSD) circuit for display of character information on a display screen, a read only memory (ROM) which is arbitrarily divided into a first ROM storage space for use by said CPU and a second ROM storage space for use by said OSD circuit, a random access memory (RAM) which is arbitrarily divided into a first RAM storage space for use by said CPU and a second RAM storage space for use by said OSD circuit, a common bus which is made up of a data bus and an address bus and to which said CPU, said OSD circuit, said ROM, and said RAM are connected in such a way as to allow said CPU and said OSD circuit to acquire an exclusive right to use said ROM and said RAM, and a bus liberation signal line over which when said common bus is not in use by said CPU, a message that said common bus is made available to said OSD circuit is sent to said OSD circuit from said CPU.

2. The microcomputer as set forth in claim 1 wherein in response to said message received from said via said bus liberation signal line, said OSD circuit starts accessing said ROM or said RAM.

3. The microcomputer as set forth in claim 1 further comprising a bus request signal line over which when said common bus is in use by said CPU, a request that said common bus be made available to said OSD circuit is sent to said CPU from said OSD circuit.

4. The microcomputer as set forth in claim 3 wherein if when said OSD circuit needs to access said ROM or said RAM, said common bus is unavailable to said OSD circuit because said ROM or said RAM is in use by said CPU, then a request that said common bus be made available to said OSD circuit is sent to said CPU from said OSD circuit via said bus request signal line, and wherein in response to said request received from said OSD circuit, said CPU temporarily stops using said ROM or said RAM, whichever has been in use by said CPU, so as to make said common bus available to said OSD circuit.

5. The microcomputer as set forth in claim 1, wherein instructions that are executed by said CPU are stored in said first ROM storage space, while character font data that are used by said OSD circuit are stored in said second ROM storage space, and wherein said first RAM storage space is used to store data for said CPU or serves as a stack region, while said second RAM storage space is used to store character information including character codes representing characters that said OSD circuit uses and attribute data of said characters.

6. A microcomputer comprising:

a central processing unit (CPU) for instruction execution, an on-screen display (OSD) circuit for display of character information on a display screen, a read only memory (ROM) which is arbitrarily divided into a first ROM storage space for use by said CPU and a second ROM storage space for use by said OSD circuit, a random access memory (RAM) which is arbitrarily divided into a first RAM storage space for use by said CPU and a second RAM storage space for use by said OSD circuit, a first common bus which is made up of a data bus and an address bus and to which said CPU, said OSD circuit, and said ROM are connected in such a way as to allow said CPU and said OSD circuit to acquire an exclusive right to use said ROM, a second common bus which is made up of a data bus and an address bus and to which said CPU, said OSD circuit, and said RAM are connected in such a way as to allow said CPU and said OSD circuit to acquire an exclusive right to use said RAM, and a bus liberation signal line over which when any one of said first and second common buses is not in use by said CPU or when neither of said first common bus and said second common bus is in use by said CPU, a message that said unused common bus or buses are made available to said OSD circuit is sent to said OSD circuit from said CPU.

7. The microcomputer as set forth in claim 6 wherein when any one of said ROM and said RAM is in use by said CPU, said OSD circuit accesses said ROM or said RAM, whichever is not in use by said CPU.

8. The microcomputer as set forth in claim 6, wherein when said ROM is not in use by said CPU, (i) said first common bus is made available to said OSD circuit and (ii) a message that said first common bus is made available to said OSD circuit is sent to said OSD circuit via said bus liberation signal line thereby allowing said OSD circuit to access said ROM via said first common bus, and wherein when said RAM is not in use by said CPU, (i) said second common bus is made available to said OSD circuit and (ii) a message that said second common bus is made available to said OSD circuit is sent to said OSD circuit via said bus liberation signal line thereby allowing said OSD circuit to access said RAM via said second common bus.

9. The microcomputer as set forth in claim 6 further comprising a bus request signal line over which when said OSD circuit needs to use either or both of said first and second common buses that are in use by said CPU, a request that said common bus or buses needed by said OSD circuit be made available to said OSD circuit is sent to said CPU from said OSD circuit.

10. The microcomputer as set forth in claim 9, wherein if when said OSD circuit needs to access said ROM, said first common bus is unavailable to said OSD circuit because said ROM is being accessed by said CPU, then a first bus request that said first common bus be made available to said OSD circuit is sent to said CPU from said OSD circuit via said bus request signal line, and wherein if when said OSD circuit needs to access said RAM, said second common bus is unavailable to said OSD circuit because said RAM is being accessed by said CPU, then a second bus request that said second common bus be made available to said OSD circuit is sent to said CPU from said OSD circuit via said bus request signal line, whereby in response to said first request, said CPU temporarily stops using said ROM and then makes said first common bus available to said OSD circuit, while in response to said second request, said CPU temporarily stops using said RAM and makes said second common bus available to said OSD circuit.

11. The microcomputer as set forth in claim 6 further comprising a first bus switch which is connected between said data bus of said first common bus and said data bus of said second common bus and a second bus switch which is connected between said address bus of said first common bus and said address bus of said second common bus so that said first and second common buses can be connected together or disconnected from each other as required.

12. The microcomputer as set forth in claim 6,
wherein instructions that are executed by said CPU are stored in said first ROM storage space, while character font data that are used by said OSD circuit are stored in said second ROM storage space, and
wherein said first RAM storage space is used to store data for said CPU or serves as a stack region, while said second RAM storage space is used to store character information including character codes representing characters that said OSD circuit uses and attribute data of said characters.

13. A microcomputer comprising:
a central processing unit (CPU) for instruction execution in units of n-bit widths where the number n is any integer,
an on-screen display (OSD) circuit for display of character information on a display screen,
a read only memory (ROM) for storing instructions for said CPU and character font data for said OSD circuit in storage spaces of said ROM which are used by said CPU and said OSD circuit respectively,
a ROM access controller for control of access to said ROM by said CPU or by said OSD circuit,
a data bus having a width of n bits for establishment of connection between said CPU and said ROM access controller,
a ROM output data signal line having a width of 2n bits for establishment of connection between said ROM and said ROM access controller.

14. The microcomputer as set forth in claim 13 wherein when said ROM is accessed via said ROM access controller on the basis of an even address value of said ROM output from said CPU:
(i) 2n-bit ROM data, comprised of first ROM data of n bits corresponding to said even address value and second ROM data of n bits corresponding to an odd address value next to and continuous with said even address value, is read out from said ROM to said ROM access controller via said ROM output data signal line,
(ii) said first ROM data is selected by said ROM access controller and then transferred to said CPU via said data bus,
(iii) said second ROM data is temporarily held in said ROM access controller.

15. The microcomputer as set forth in claim 14 wherein when said odd address value continuous with said even address value is output to said ROM access controller from said CPU, said ROM address controller transfers to said CPU said second ROM data temporarily held in said ROM access controller and corresponding to said odd address value, without access to said ROM.

16. The microcomputer as set forth in claim 14 wherein when said odd address value continuous with said even address value is output to said ROM access controller from said CPU, said OSD circuit accesses said ROM via said ROM access controller so that in such a period said character font data can be read out to said OSD circuit from said ROM.

17. The microcomputer as set forth in claim 13 further comprising a ROM access request signal line over which a ROM access request signal requesting for access to said ROM is output from said OSD circuit to said ROM access controller.

18. The microcomputer as set forth in claim 17 wherein during an absence of access to said ROM by said CPU via said ROM access controller, said ROM access request signal is output from said OSD circuit to said ROM access controller,
whereby:
said ROM access controller selects an address signal line from said OSD circuit,
said ROM is accessed on the basis of an address value from said address signal line, and
said character font data is read out to said OSD circuit.

19. The microcomputer as set forth in claim 13 further comprising a ROM address branch signal line over which a ROM address branch signal, representative of the occurrence of an event that ROM address continuity is broken due to a branch, an interrupt or the like of an instruction of said CPU, is output from said CPU to said ROM access controller.

20. The microcomputer as set forth in claim 19,
wherein when said ROM address branch signal is output:
(i) said ROM is accessed, regardless of which of an even address value and an odd address value a ROM address, output from said CPU at a branch point, assumes;,
(ii) ROM data of 2n bits on the basis of said ROM address is read out to said ROM access controller, and
(iii) of said 2n-bit ROM data, ROM data of n bits corresponding to said ROM address is transferred to said CPU, and
wherein when said ROM address assumes an even address value:
(i) ROM data of n bits corresponding to said even address value is read out simultaneously with ROM data of n bits corresponding to an odd address value next to and continuous with said even address value, and
(ii) said n-bit ROM data corresponding to said odd address value is temporarily held in said ROM access controller.

21. The microcomputer as set forth in claim 13,
said ROM access controller including:
a latch for holding ROM data of n bits,
a ROM data selector for selecting one of three different data inputs having a width of n bits and then outputting the selected data input to said CPU, and
a ROM data selection controller for controlling a data selection operation in said ROM data selector,
wherein when said CPU accesses said ROM, 2n-bit ROM data, comprised of first ROM data of n bits corresponding to an even address value from said CPU and second ROM data of n bits corresponding to an odd address value continuous with said even address value from said CPU, is read out from said ROM, and
wherein said first n-bit ROM data, said second n-bit ROM data, and an output from said latch relating to said second n-bit ROM data respectively serve as a first to a third input to said ROM data selector.

22. A visual display unit comprising a microcomputer and a display device with a display screen for displaying character information according to a display signal from said microcomputer, said microcomputer including:

a central processing unit (CPU) for executing instructions, an on-screen display (OSD) circuit for displaying said character information on said display screen, a read only memory (ROM) which is arbitrarily divided into a first ROM storage space for use by said CPU and a second ROM storage space for use by said OSD circuit, a random access memory (RAM) which is arbitrarily divided into a first RAM storage space for use by said CPU and a second RAM storage space for use by said OSD circuit, a common bus which is formed of a data bus and an address bus and to which said CPU, said OSD circuit, said ROM, and said RAM are connected in such a way as to allow said CPU and said OSD circuit to acquire an exclusive right to use said ROM and said RAM, and a bus liberation signal line over which when said common bus is not in use by said CPU, a message that said common bus is made available to said OSD circuit is sent to said OSD circuit from said CPU, wherein at the time of displaying a character on said display screen, character font data for said character is read out from said ROM to said OSD circuit and attribute data for said character is read out from said RAM to said OSD circuit, and wherein based on said character font data and on said attribute data, said display signal is generated and sent to said display device for display of said character on said display screen.

23. A visual display unit comprising a microcomputer and a display device with a display screen for displaying character information according to a display signal from said microcomputer, said microcomputer including:

a central processing unit (CPU) for executing instructions, an on-screen display (OSD) circuit for displaying said character information on said display screen, a read only memory (ROM) which is arbitrarily divided into a first ROM storage space for use by said CPU and a second ROM storage space for use by said OSD circuit, a random access memory (RAM) which is arbitrarily divided into a first RAM storage space for use by said CPU and a second RAM storage space for use by said OSD circuit, a first common bus which is formed of a data bus and an address bus and to which said CPU, said OSD circuit, and said ROM are connected in such a way as to allow said CPU and said OSD circuit to acquire an exclusive right to use said ROM, a second common bus which is formed of a data bus and an address bus and to which said CPU, said OSD circuit, and said RAM are connected in such a way as to allow said CPU and said OSD circuit to acquire an exclusive right to use said RAM, and a bus liberation signal line over which when any one of said first and second common buses is not in use by said CPU or when neither of said first common bus and said second common bus is in use by said CPU, a message that said unused common bus or buses are made available to said OSD circuit is sent to said OSD circuit from said CPU, wherein at the time of displaying a character on said display screen, character font data for said character is read out from said ROM to said OSD circuit and attribute data for said character is read out from said RAM to said OSD circuit, and wherein based on said character font data and on said attribute data, said display signal is generated and sent to said display device for display of said character on said display screen.

24. A visual display unit comprising a microcomputer and a display device with a display screen for displaying character information according to a display signal from said microcomputer, said microcomputer including:

a central processing unit (CPU) for instruction execution in units of n-bit widths where the number n is any integer, an on-screen display (OSD) circuit for display of character information on said display screen, a read only memory (ROM) for storing instructions for said CPU and character font data for said OSD circuit in storage spaces of said ROM which are used by said CPU and said OSD circuit respectively, a ROM access controller for control of access to said ROM by said CPU or by said OSD circuit, a data bus having a width of n bits for establishment of connection between said CPU and said ROM access controller, and a ROM output data signal line having a width of 2n bits for establishment of connection between said ROM and said ROM access controller, wherein at the time of displaying a character on said display screen, character font data for said character is read out from said ROM to said OSD circuit, and wherein based on said character font data, said display signal is generated and sent to said display device for display of said character on said display screen.

* * * * *